United States Patent Office 2,732,711
Patented Jan. 31, 1956

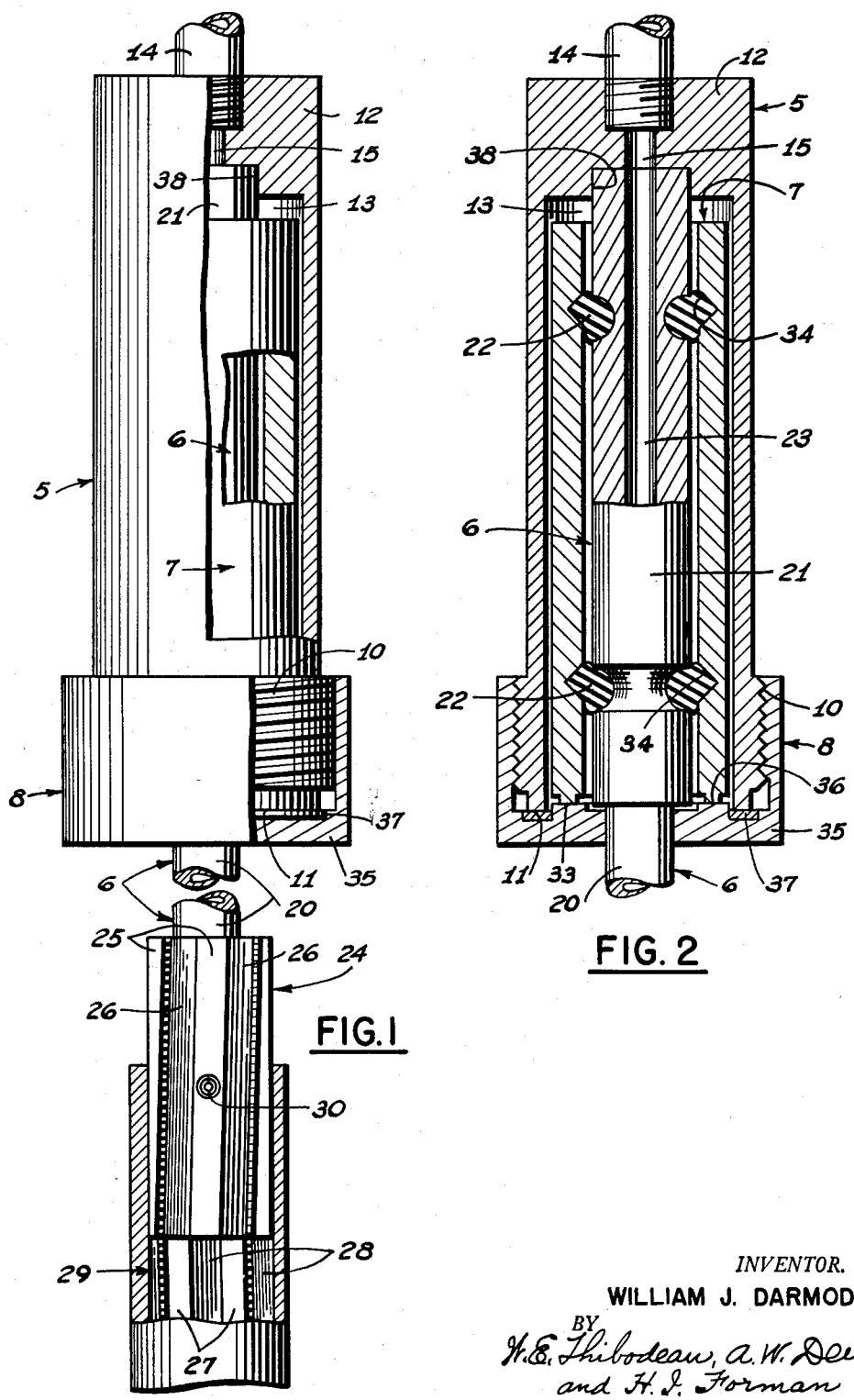

2,732,711

MEANS FOR PREVENTING LEAKAGE BETWEEN A ROTATED SHAFT AND A HOUSING

William J. Darmody, Philadelphia, Pa.

Application July 11, 1952, Serial No. 298,486

8 Claims. (Cl. 73—37.9)

(Granted under Title 35, U. S. Code (1952), sec. 266)

The invention described herein may be manufactured and used by or for the Government for governmental purposes without the payment of any royalty thereon.

My invention relates broadly to means for preventing leakage of fluid between a rotatable shaft, or like member, and its housing. In particular, although not limited solely thereto, my invention relates to means, especially applicable to the art of checking the dimensional accuracy of rifled gun bores or other tubes by the use of air-operated gages, for preventing leakage of air between a rotatable supporting member carrying a gaging head and that member's housing.

The principles of construction and operation of air-operated gages, per se, are well known to those skilled in the art, and, therefore, need not be dealt with at length here. However, a brief explanation relative to the use of such gages in connection with checking the dimensional accuracy of rifled gun bores will be made in order to clarify the need and function of the present invention as herein illustrated.

In essence, an indication of the dimensional accuracy of a rifled gun bore or other tube being gaged by the use of air depends upon the rate at which air flows from a gaging head placed within the bore. The gaging head is mounted at one end of a conveniently long supporting member, to the opposite end of which a flexible air supply conduit is attached, and is provided with a continuous stream of air conducted through that support member and its flexible conduit. In the lateral surface of the gaging head are one or more air exit jets through which air flows from the gaging head to the outside atmosphere. During use, the gaging head is inserted into and moved axially through the gun bore. It is intended that, if the gun bore be within the maximum and minimum limits of acceptable dimensional accuracy, air will not flow from the gaging head faster or slower than a certain rate.

The rate of flow of air from the gaging head is indicated upon a meter associated, in usual fashion, with the gaging head. As the diameter of the gun bore being gaged approaches the minimum limit of acceptable dimensional tolerance, the space between the gaging head and the gun bore decreases. As a result, the rate of flow of air from the gaging head decreases. As the diameter of the gun bore being gaged approaches the maximum limit of acceptable dimensional tolerance, the space between the gaging head and the gun bore increases. In consequence of this, the rate of flow of air from the gaging head increases.

As long as the rate of flow of air from the gaging head, as indicated by the meter, maintains itself between prescribed upper and lower limits, the gun bore being gaged is assumed to be within acceptable limits of dimensional accuracy. If the meter should indicate the rate of air flow from the gaging head is not within the prescribed upper and lower limits, the gun bore being gaged will be assumed to be unacceptable from the standpoint of dimensional accuracy.

With prior art air-operated gages, as the gaging head is moved axially along the rifled gun bore, the gaging head, and therefore the supporting member with its attached flexible conduit, must be rotated because of the gaging head's engagement with the rifled bore. The necessity for this rotation of the gaging head, together with its associated supporting member and flexible conduit, was rather awkward and cumbersome, especially in gaging long bores, in that the flexible conduit frequently became snagged in itself. This condition often became so pronounced that the air supply to the gaging head was seriously impeded with consequent erroneous determination of the gun bore's dimensional accuracy.

Until the advent of my invention, therefore, the matter of gaging rifled gun bores by the use of air-operated gages was hampered by the fact that no means had been provided for allowing the gaging head and its supporting member to rotate as they were moved axially relative to the gun bore being gaged, without making it necessary also, to rotate the flexible air supply conduit.

With my invention I have eliminated the disadvantages inherent in prior art air-operated gages for rifled gun bores and have introduced novel concepts equally applicable to the art of sealing any rotatable member in its housing. The latter will be explained later. Fundamentally, in practicing my invention, as adapted to air-operated gages for checking the dimensional accuracy of rifled gun bores, the gaging head is attached to one end of a hollow supporting member which is conveniently long to permit passage of the gaging head axially through the gun bore. The other end of this supporting member is provided, preferably, with a plurality of resilient bands. Fitting over these resilient bands is a tubular sleeve whose end surface, toward the gaging head, is superfinished as by lapping or other convenient process. Thus far, the resilient bands form a sealing relationship between the supporting member and the tubular sleeve.

The supporting member and its associated tubular sleeve are then positioned in a housing to which the delivery end of a flexible air supply conduit is attached. In this housing, adjacent the sleeve's superfinished end surface, is a similarly finished surface of slightly larger diameter. As the supporting member and tubular sleeve are positioned in the housing, the tubular sleeve is displaced axially relative to the supporting member so that the resilient bands are additionally stressed. This action causes them constantly to exert a force in an axial direction which presses the tubular sleeve's and the housing's superfinished surfaces against each other in a sealing relationship. The resilient bands thus fulfill a second important and novel function.

With my invention it is then possible to move the gaging head and the supporting member axially through the rifled gun bore to be gaged, allowing them to rotate as required in so doing, without the necessity of rotating the flexible air supply conduit. Thus, the hazards and attendant ill consequences of a snagged air supply conduit are completely avoided.

Referring now to the specific objects of my invention, it will be understood my broad objective is to provide a simple, effective means of preventing fluid leakage between a rotatable shaft, or like member, and its housing.

Another object is to provide a leakproof handle construction for air-operated gages used to check the dimensional accuracy of rifled gun bores, or other similar parts, so as to permit rotation of the gaging head and its supporting member without necessitating rotation of the flexible air supply conduit feeding those parts.

The foregoing and other objects of my invention will become apparent from an inspection of the following description and the accompanying drawings which explain and demonstrate, respectively, one embodiment of my invention as adapted to an air-operated gage for the purpose mentioned, and wherein:

Fig. 1 is a view, partly broken away and partly in section, of said illustrative embodiment of my invention; and Fig. 2 is a longitudinal, central cross-section of the handle portion of the Fig. 1 gage showing structural details thereof.

The embodiment of my invention shown in those figures comprises, basically, the hollow, cylindrical housing 5, the hollow, supporting member 6 rotatable therein, the tubular sleeve 7 and the cup-like housing cap 8.

Housing

As shown in the figures, housing 5 has an externally threaded open end 10, having the smoothly finished, annular, end surface 11, and a closed end 12. Extending into the housing from its open end almost to the closed end is a blind recess 13. Threadedly or otherwise conveniently joined to the housing's closed end 12, in leakproof fashion, is the flexible air supply conduit 14 which extends from the housing to a meter or indicating device (not shown) usually associated with air-operated gages. Also at the closed end of the housing is the opening 15 which extends between hollow, supporting member 6 and air supply conduit 14 (see Figs. 1 and 2).

Supporting member

In the drawings it can be seen that supporting member 6 comprises the conveniently long, slender portion 20 and the somewhat larger diametered stem portion 21. This portion, as evident from Fig. 2, prevents the supporting member from being pulled from the housing after those parts are assembled. In practice, slender portion 20 is made any required length depending upon the length of the gun bore whose dimensional accuracy is to be gaged.

Near each end of stem portion 21 is a circumferential groove in each of which a resilient O ring 22 is mounted in conventional fashion (see Fig. 2).

Extending axially through supporting member 6, from end to end, is the axial opening 23 which, at later assembly, becomes continuous with opening 15 in the housing's closed end (see Fig. 2).

Attached to the end of supporting member 6 opposite stem portion 21, as by threading, or other convenient leakproof means, is the gaging head 24 (see Fig. 1).

This gaging head, as is well known, is an accurately made, precision gaging plug in whose lateral surface the lands 25 and the grooves 26 corresponding to the lands 27 and grooves 28 in the rifled gun bore 29 being gaged are formed. Conveniently located in usual manner in this gaging head are the air jets 30, one of which is shown in Fig. 1.

Internally, the gaging head is provided with an opening (not shown) through which, during use of the gaging head, air passing into the head from supporting member 6 passes through air jets 30, thence to the external atmosphere.

Tubular sleeve

Tubular sleeve 7 is provided with annular end surface 33 (see Fig. 2) which is superfinished, as by lapping or other convenient manner, and is mounted upon the supporting member's stem portion 21 by means of resilient O rings 22 which are accommodated in the grooves 34 located near each end of the sleeve (see Fig. 2) and which form a sealing relationship between the supporting member's stem portion and the tubular sleeve.

It will be apparent that the groove means which I have provided for accommodating the resilient rings between suporting member 6 and tubular sleeve 7, to effect a sealing relationship therebetween, is one of expediency only. Those skilled in the art know that the resilient rings can also be positioned between those parts by molding, cementing, or other convenient ways. The function served by the resilient rings is the permitting of some axial displacement between the supporting member and the sleeve without destroying the sealing relationship. The reason for this will become apparent later.

Housing cap

Cuplike housing cap 8, before attachment to the housing's open end 10, is rotatable upon the supporting member's slender portion 20. Located inside the closed end 35 of this cap are an annular surface 36, superfinished as by lapping or other convenient manner (see Fig. 2) and a ring gasket 37 (see Figs. 1 and 2).

As shown in Fig. 2, annular surface 36 is sufficiently wide so as to overlap the tubular sleeve's annular end surface 33, and also, ring gasket 37 is sufficiently wide to overlap the housing's annular end surface 11 when those parts are assembled.

In adding the previously assembled tubular sleeve 7 and supporting member 6 to housing 5, the free end of the supporting member's stem portion 21 is rotatably accommodated in a recess 38 formed in the housing's closed end 12, and housing cap 8 is threadedly joined to the housing's open end 10. Supporting member 6 thereby becomes rotatably supported within the housing. It is not intended, nor required, that a sealing relationship exist between stem portion 21 and the housing's closed end 12, nor between the supporting member's slender portion 20 and the housing cap's closed end 35.

Summary

As housing cap 8 is threaded upon housing 5, the cap's annular surface 36 abuts the sleeve's annular end surface 33, thereby moving sleeve 7 in an axial direction relative to the supporting member's stem portion 21 and away from cap 8 into recess 13. Stem portion 21 is prevented from similar axial movement by the bottom of recess 38. This relative movement stresses resilient rings 22 in a direction away from cap 8, thereby enhancing their sealing effect between tubular sleeve 7 and stem portion 21. The stressed rings 22, by virtue of their inherent tendency to revert to their normal condition, additionally serve to urge sleeve 7 toward cap 8 so that the sleeve's annular surface 33 is pressed against the cap's annular surface 36, thereby creating a sealing effect between those parts.

At the final stage of threading cap 8 onto housing 5, the housing's end surface 11 abuts ring gasket 37 under pressure, thereby creating a continuous seal between the cap and housing.

With the illustrative embodiment of my invention assembled as described, supporting member 6 is rotatably supported by co-joined housing 5 and housing cap 8. As earlier pointed out, there are sealing relationships between tubular sleeve 7 and the supporting member's stem portion 21, between annular surfaces 33 and 36, and between housing 5 and housing cap 8. As a result, even though air should enter the housing's blind recess 13 through flexible conduit 14 and opening 15, it would be prevented from escaping past the other end of the housing by the sealing relationships existing at the aforementioned places. Conversely, air outside housing 5 is prevented from leaking into the housing. Thus, as a prime result of my invention, gaging head 24 and supporting member 6 are rotatable relative to housing 5 during the gaging operation without necessitating rotation of flexible conduit 14. At the same time, the metered air supplied through conduit 14 is sealed in housing 5, thus assuring against error caused either by loss of air that does not enter into the bore gaging process, or by addition of nonmetered air from the outside atmosphere.

Those skilled in the art realize that my invention is amenable to numerous modifications and variations without departing from its original spirit and scope. Therefore, it may take many forms other than the one previously described for illustrative purposes. For example, from a broad aspect, housing 5 may be construed to represent housings in general, and it need be provided only with an opening to allow passage of a rotatable shaft, or like member, therethrough.

Similarly, supporting member 6, from a broad aspect, may be construed to represent shafts, or other like rotatable members, in general and it need not of necessity be provided with an axial opening 23, nor gaging head 24.

It can be appreciated, too, that with a plain housing and shaft combination, annular surface 36 could be integral with the housing, instead of being part of a cap or cover.

For the foregoing and other reasons the full scope of my inventive contribution to the useful arts and sciences can best be defined by the metes and bounds of the appended claims, and it is only thereby that I wish to be limited in patent coverage.

From the foregoing it will be apparent to those skilled in the art that I have provided a simple, effective means of preventing fluid leakage between a rotatable shaft, or like member, and its housing; and that I have provided a leakproof handle construction for air-operated gages used to check the dimensional accuracy of rifled gun bores, or other similar parts, so as to permit rotation of the gaging head and its supporting member without necessitating rotation of the flexible air supply conduit feeding those parts. On the basis of this disclosure, I claim:

1. Means, for preventing leakage between a housing and a shaft, comprising: a housing having an opening in the wall thereof and having a sealing surface circumferentially surrounding the opening; a shaft rotatably disposed within said housing and projecting through said opening, a sleeve disposed about a portion of said shaft within said housing, one end of said sleeve being disposed in slidable sealing contact with said housing's sealing surface; and resilient means between the outside of said shaft and the inside of said sleeve, said resilient means being in engagement with the outside of the shaft and the inside of the sleeve so as to seal the space therebetween and so that said resilient means, by such engagement with the shaft and the sleeve, is stressed so as constantly to cause that sleeve to assume the slidable sealing contact with said housing's sealing surface.

2. Means, for preventing leakage of a fluid between a housing and a shaft comprising: a housing having an opening through the wall thereof and having a sealing surface circumferentially surrounding the opening; a shaft rotatable disposed within said housing and projecting through said housing's opening; a sleeve disposed about a portion of said shaft within said housing, one end of said sleeve being in slidable sealing contact with said housing's sealing surface; and at least one resilient member between the outside of said shaft and the inside of said sleeve, said resilient member being in engagement with the shaft's outside and the sleeve's inside so as to seal the space therebetween and so that said resilient member, by such engagement with the shaft and the sleeve, is stressed so as to urge constantly said sleeve's end into slidable sealing contact with said housing's sealing surface.

3. Means, for preventing leakage of a fluid between a housing and a shaft, comprising: a housing having an opening through the wall thereof; a cover sealingly secured to said housing over the housing's opening, said cover having an opening therethrough and having a sealing surface circumferentially surrounding that opening; a shaft rotatably disposed within said housing and extending through said cover's opening; a sleeve disposed about a portion of said shaft within said housing, one end of said sleeve being in slidable sealing contact with said cover's sealing surface; and at least one resilient member between the outside of said shaft and the inside of said sleeve, said resilient member being in engagement with the outside of the shaft and the inside of the sleeve so as to seal the space therebetween and so that said resilient member, by such engagement with the shaft and the sleeve, is stressed so as to urge constantly said sleeve's end into slidable sealing contact with said cover's sealing surface.

4. In a leakproof connection between a rotatable fluid dispensing means and a relatively non-rotatable fluid-supplying means, the combination of: a housing having first and second openings through the wall thereof and having a sealing surface circumferentially surrounding said first opening; a hollow fluid-dispensing member rotatably disposed within said housing and extending through said first opening; a fluid-supplying member connected to said housing and communicating with the interior thereof through said second opening; a sleeve disposed about a portion of said fluid-dispensing member within said housing, one end of said sleeve being in slidable sealing contact with said housing's sealing surface; and at least one resilient member being disposed between said fluid-dispensing member and said sleeve, said resilient member being so constructed and arranged as to be in sealing engagement with said fluid-dispensing member and said sleeve and constantly to urge said sleeve's end into slidable sealing contact with said housing's sealing surface; whereby said fluid-dispensing member is rotatable relative to said housing and to said fluid-supplying member without leakage of fluid from said housing and also without twisting and entangling of said fluid-supplying member.

5. In a leakproof connection between a rotatable fluid-dispensing means and a relatively non-rotatable fluid-supplying means, the combination of: a housing having first and second openings through the wall thereof and having a sealing surface circumferentially surrounding the first opening; a hollow member rotatably disposed within said housing and extending through said first opening; a fluid-supplying member connected to said housing and communicating with the interior thereof through said second opening; a sleeve disposed about a portion of said hollow member within said housing, one end of said sleeve being in slidable sealing contact with said housing's sealing surface; at least one resilient member being disposed between said hollow member and said sleeve, said resilient member being so constructed and arranged as to be in sealing engagement with said hollow member and said sleeve and constantly to press said sleeve's end into slidable sealing contact with said housing's sealing surface; and a fluid-dispensing member sealingly secured to that part of said hollow member outside said housing and providing for emission of fluid; whereby said hollow member and said fluid-dispensing member can be rotated relative to said housing and to said fluid-supplying member without leakage of fluid from said housing and also without twisting entangling said fluid supplying member.

6. Apparatus, useful in the art of gaging dimensional accuracy by the use of air operated equipment, comprising: a housing having first and second openings thereinto and having a sealing surface circumferentially surrounding said first opening; a hollow shaft rotatably disposed in said housing, part of said shaft extending through said first opening; an air-supply conduit connected to said housing and communicating with the interior thereof through said second opening; a sleeve disposed about a portion of said shaft within said housing, one end of said sleeve being in slidable sealing contact with said housing's sealing surface; at least one resilient member being disposed between said shaft and said sleeve, said member being so constructed and arranged as to be in sealing engagement with said shaft and said sleeve and constantly to press said sleeve's end into slidable sealing contact with said housing's sealing surface; and an air operated dimensional gaging head secured in leakproof manner to that part of said shaft outside said housing and providing for emission of air; whereby said shaft and said gaging head are rotatable relative to said housing and to said conduit without leakage of air from said housing and also without twisting and entangling said conduit.

7. In a leakproof connection between a rotatable fluid-dispensing means and a relatively non-rotatable fluid-supplying means, the combination of: a housing having first and second openings thereto; a cover sealingly secured to said housing over said first opening, said cover having an opening therethrough and having a sealing surface circumferentially surrounding that opening; a hollow member rotatably disposed in said housing, part of said hollow member extending through said cover's opening; a fluid-supplying member sealingly connected to said housing and communicating with the interior thereof through said second opening; a sleeve disposed about a portion of said hollow member within said housing; one end of said sleeve being in slidable sealing contact with said cover's sealing surface; at least one resilient member being disposed between said hollow member and said sleeve, said resilient member being so constructed and arranged as to be in sealing engagement with said hollow member and said sleeve and constantly to urge said sleeve's end into slidable sealing contact with said cover's sealing surface; and a fluid-dispensing member sealingly secured to that part of said hollow member outside said housing and providing for emission of fluid; whereby said hollow member and said fluid-dispensing member can be rotated relative to said housing and to said fluid-supplying member without leakage of fluid from said housing and also without twisting and entangling said fluid-supplying member.

8. Apparatus, useful in the art of gaging dimensional accuracy by use of air operated equipment, comprising: a housing having first and second openings thereinto; a cover sealingly secured to said housing over said first opening, said cover having an opening therethrough and having a sealing surface circumferentially surrounding that opening; a hollow member rotatably disposed in said housing and extending through said cover's opening; and air supply conduit connected to said housing and communicating with the interior thereof through said second opening; a sleeve disposed about a portion of said hollow member within said housing, one end of said sleeve being in slidable sealing contact with said cover's sealing surface; at least one resilient member being disposed between said hollow member and said sleeve, said resilient member being so constructed and arranged as to be in sealing engagement with said hollow member and said sleeve and constantly to press said sleeve's end into slidable sealing contact with said cover's sealing surface; and an air operated dimensional gaging head sealingly secured to that part of said hollow member outside said housing and providing for emission of air; whereby said hollow member and said gaging head are rotatable relative to said housing and to said conduit without leakage of air from said housing and also without twisting and entangling said conduit.

References Cited in the file of this patent

UNITED STATES PATENTS

| | | |
|---|---|---|
| 1,075,693 | Cassidy | Oct. 14, 1913 |
| 1,409,022 | Paxton | Mar. 7, 1922 |
| 2,370,219 | Aller | Feb. 27, 1945 |
| 2,390,892 | McCormack | Dec. 11, 1945 |
| 2,394,715 | Phillips | Feb. 12, 1946 |
| 2,468,885 | Lubbock | May 3, 1949 |
| 2,631,048 | Palmer | Mar. 10, 1953 |